United States Patent [19]
Kamijo et al.

[11] Patent Number: 4,534,441
[45] Date of Patent: Aug. 13, 1985

[54] SEAT BELT RETRACTOR

[75] Inventors: Ken Kamijo, Zushi; Yasuyuki Uekusa, Yokosuka, both of Japan

[73] Assignee: Nissan Motor Co., Ltd., Japan

[21] Appl. No.: 589,751

[22] Filed: Mar. 15, 1984

[30] Foreign Application Priority Data

Apr. 14, 1983 [JP] Japan ................................. 58-66160

[51] Int. Cl.³ .......................................... B60R 21/10
[52] U.S. Cl. ................................... 180/268; 180/269;
280/806; 242/107.6; 242/107.7
[58] Field of Search ................ 180/268, 269; 280/806,
280/807; 242/107.6, 107.7

[56] References Cited

U.S. PATENT DOCUMENTS 3,771,742 11/1973 Okada ........................... 242/107.6 X
3,880,364 4/1975 Andres .......................... 242/107.4 R
3,986,093 10/1976 Wakamatsu .................... 280/802 X
4,149,172 4/1980 Fukunaga ..................... 242/107.6 X
4,187,925 2/1980 Lindblad ............................. 180/268
4,384,735 5/1983 Maeda ............................. 280/807 X
4,489,804 12/1984 Kamijo ........................... 280/807 X

FOREIGN PATENT DOCUMENTS 0085396 8/1983 European Pat. Off. ............ 280/807

Primary Examiner—Harold W. Weakley
Attorney, Agent, or Firm—Leydig, Voit and Mayer

[57] ABSTRACT

A seat belt retractor comprises a take-up shaft which is spring biased in a belt retracting direction; a planetary gearing having a sun gear nonrotatably mounted to the take-up shaft, a ring gear and a planet pinion; a mechanical tensionless mechanism which prevents the planet pinion from orbiting in the same direction as the belt retracting direction; and a motor actuated slack control mechanism meshing with the ring gear, wherein the tensionless state is established by preventing the orbiting movement of the planet pinion and the slack control is effected by rotating the ring gear.

5 Claims, 11 Drawing Figures

SEAT BELT RETRACTOR

BACKGROUND OF THE INVENTION

The present invention relates to a seat belt reactor with a tensionless mechanism.

Published Japanese Patent Application No. 52-9891 discloses a seat belt reactor with a tensionless mechanism wherein an electric motor is operated right after a seat occupant has worn a seat belt so as to rotate a belt take-up shaft in a belt feeding direction by a predetermined angle, thereby to add a predetermined amount of slack to the seat belt. This known seat belt retractor, however, has a problem that since the predetermined amount of slack is added to the seat belt irrespective of the amount of an original slack which takes place when the occupant has worn the seat belt, the resultant amount of slack may exceed an allowable amount if the original slack is large. This may hamper the effective operation of the seat belt upon collision of a vehicle.

Another problem encountered in this known seat belt reactor resides in that since the belt take-up shaft is locked and prevented from rotating in the belt feeding direction, the belt cannot be pulled out of the seat belt retractor further once the tensionless state is established, thus restraining the seat occupant from changing his posture.

SUMMARY OF THE INVENTION

According to one aspect of the present invention, there is provided a seat belt retractor comprising a take-up shaft which is spring biased in a belt retracting direction; a gear mechanism; a tensionless mechanism operatively coupled to the gear mechanism and operable to prevent the take-up shaft from rotating in the belt retracting direction; and a motor actuated slack control mechanism operable to rotate the take-up shaft.

According to another aspect of the present invention, there is provided a seat belt retractor which is able to provide an appropriate amount of slack of the seat belt in response to running state of a vehicle and which is able to feed a necessary length of the seat belt for the seat occupant to change his posture.

Another object of the present invention is to provide a more reliable and endurable seat belt retractor of the type wherein slack of a seat belt is controlled by a motor.

Another object of the present invention is to provide a seat belt retractor which provides an appropriate amount of slack of the seat belt in response to running state of a vehicle and which allows that seat occupant to change his posture easily.

DESCRIPTION OF THE EMBODIMENT

Referring to the drawings, the preferred embodiment according to the present invention is described.

Figure 1:
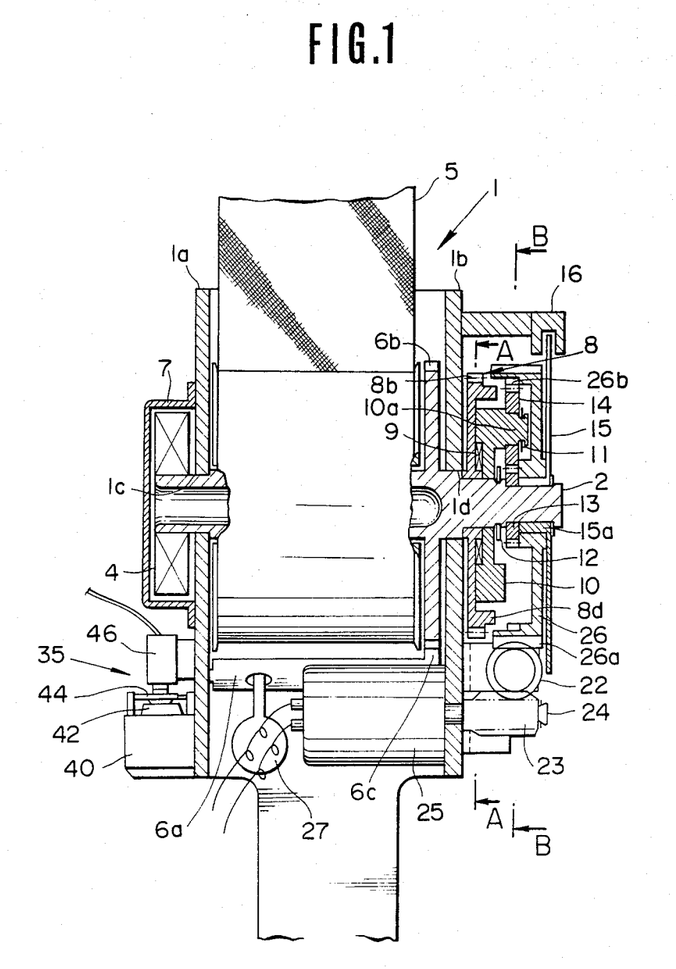
FIG. 1 is a diagrammatic cross sectional view taken along the line C—C of FIG. 2 illustrating an embodiment of a seat belt retractor according to the present invention.
Figure 2:
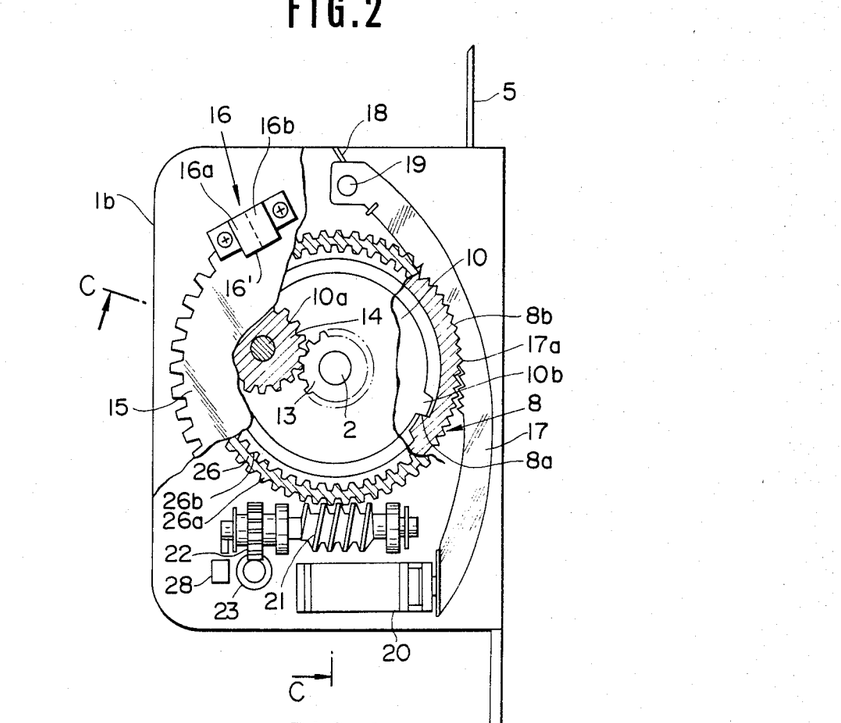
FIG. 2 is a side elevational view partly section along the line A—A and the line B—B of FIG. 1.

As shown in FIGS. 1 and 2, a seat belt retractor comprises a housing 1 including two parallel side walls 1a, 1b. A belt take-up shaft 2 spans across the side walls 1a and 1b and is rotatably received in apertures 1c and 1d formed through the side walls, respectively. The belt take-up shaft 2 is always biased by a return spring 4 in a belt retracting direction, i.e., a clockwise direction as viewed in FIG. 2. The return spring 4 is in the form of a spiral spring having an outer end anchored to a spring cover 7 fixedly mounted to the side wall 1a and an inner end anchored to the belt take-up shaft 2. The seat belt retractor also comprises a ratchet 6b integral with the belt take-up shaft 2, a lever 6a formed with a pawl 6c adapted to engage with the ratchet 6b and a weight 27 which constitute a known emergency lock mechanism. The emergency lock mechanism does not constitute any part of the present invention and thus further description thereof is omitted.

The take-up shaft 2 has a reduced diameter axial end section rotatably carrying a ratchet wheel 8 formed with outer teeth 8b. The ratchet wheel 8 has a sleeve section 8d formed with an inwardly extending projection 8a as best seen in FIG. 2. Disposed within the sleeve section 8d is a memory wheel 10 which is rotatably mounted to the take-up shaft 2 in an axially fit manner by a snap ring 12. As best seen in FIG. 2, the memory wheel 10 is formed with an outwardly extending projection 10b adapted to abut with the projection 8a of the ratchet wheel 8. The memory wheel 10 is always biased by a spiral spring 9 operatively connected between the memory wheel 10 and the ratchet wheel 8 in a clockwise direction as viewed in FIG. 2 so as to maintain the projection 10b engaged with the projection 8a.

Referring to FIG. 2, a stopper lever 17 having one end pivoted about a pin 19 has teeth 17a adapted to mesh with the external teeth 8b of the ratchet wheel 8. The stopper lever 17 is biased by a spring 18 toward a disengaged position. The stopper lever 17 has the opposite end adapted to be attracted by a solenoid 20, i.e., an electromagnet, when the latter is energized or turned ON and urged against the spring 18 to an engaged position wherein the teeth 17a mesh with the external teeth 8a of the ratchet wheel 8, thereby to lock the same.

The memory wheel 10 serves as a carrier of a planetary gearing which comprises a sun gear 13 nonrotatably mounted to the take-up shaft 2, a planet pinion 14 rotatably mounted to a spingle 10a formed on the memory wheel 10 and a ring gear 26. The ring gear 26 is rotatably mounted to a boss section 15a of a slit wheel 15. The slit wheel 15 is nonrotatably mounted to the take-up shaft 2. The ring gear 26 is formed with a worm wheel 26a meshing with a worm 21 which is driven by an electric motor 25, via a worm 23 fixed to the motor shaft and a worm wheel 22 rotatable with the worm 21 as best seen in FIG. 2.

For purpose of detecting an angle and a direction of the rotation of the take-up shaft 2, an angular position sensor 16 is provided which includes the slit wheel 15 and a photocoupled position transducer 16' fixedly mounted to the side wall 1b. The transducer 16' has a pair of photo interrupters 16a and 16b (see FIG. 2), which are angularly disposed with respect to the rotation of the slit wheel 15 in a known manner. Each of the photo interrupters 16a and 16b produces an output signal which becomes a HIGH level and a LOW level in response to the passage of the slits of the slit wheel 15. Thus, the photocoupled position transducer 16' produces a two-bit output signal which can be easily processed to determine the angle and the direction of the rotation of the take-up shaft 2. A flowchart which processes the two-bit output signal is found in a co-pending U.S. patent application Ser. No. unknown, filed Feb. 15, 1984 which claims priority based on Japanese Patent Application No. 58-24606 filed Feb. 18, 1983. Particular attention is directed to FIGS. 1, 2(A), 2(B) and 8 and the descriptive parts referring to these Figures.

Figure 3:
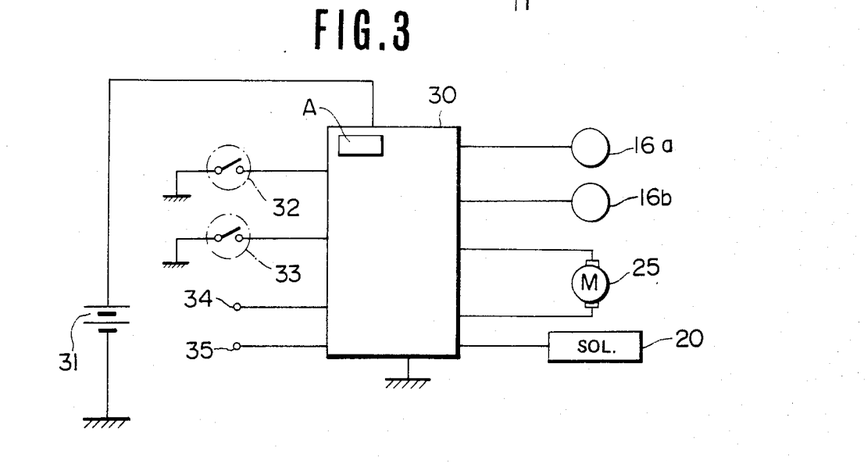
FIG. 3 is a block diagram of a control unit of the seat belt retractor.

The motor 25 and the solenoid 20 are actuated under the control of a control unit 30, as shown by a block diagram in FIG. 3. The control unit 30 comprises a microcomputer including, as usual, a CPU, an I/O interface, a RAM, a ROM and a timer A. The ROM stores a program illustrated by the flowchart shown in FIGS. 4(A) and 4(B).

Referring to FIG. 3, the reference numeral 31 denotes a battery as a source of electricity for the control unit 30 which receive inputs from photo interrupters 16a, 16b, a buckle switch 32, a seat switch 33, a vehicle speed sensor 34, and a low G sensor 35.

The buckle switch 32 is well known. The seat switch 33 is known from U.S. Pat. No. 4,384,735 which is hereby incorporated by reference in its entirety. This U.S. patent discloses a seat switch 54 which is responsive to the operation of a seat sliding mechanism and another seat switch 54' which is responsive to the operation of a seatback tilting mechanism. It also discloses a buckle switch 46.

Simply describing, the buckle switch 32 is normally opened, but closed or turned ON when the tongue and the buckle of the seat belt 5 are coupled. The seat switch 33 is normally closed, but opened or turned OFF when a seat adjustment mechanism or a seatback tilting mechanism of a seat is in operation.

The vehicle speed sensor 34 is known from Page V-20 of Service Periodical No. 491 issued by Nissan Motor Co., Ltd. Briefly describing, the vehicle speed sensor 34 converts the rotation of a speed meter cable to a train of pulses.

Figure 9:
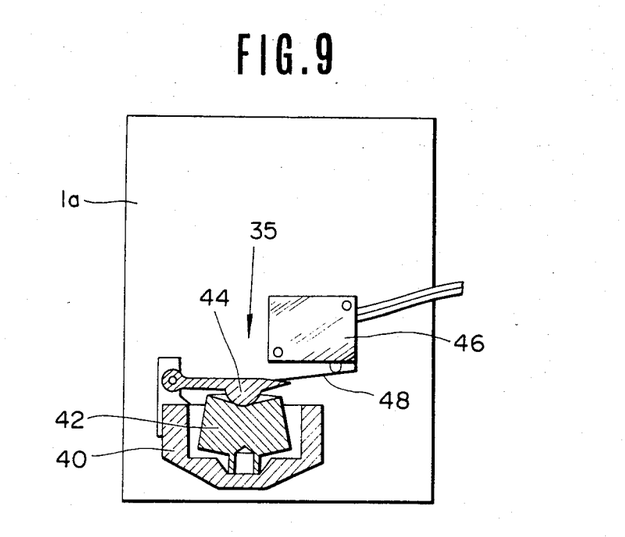
FIGS. 9 and 10 are views illustrating the operation of a low G sensor.
Figure 10:
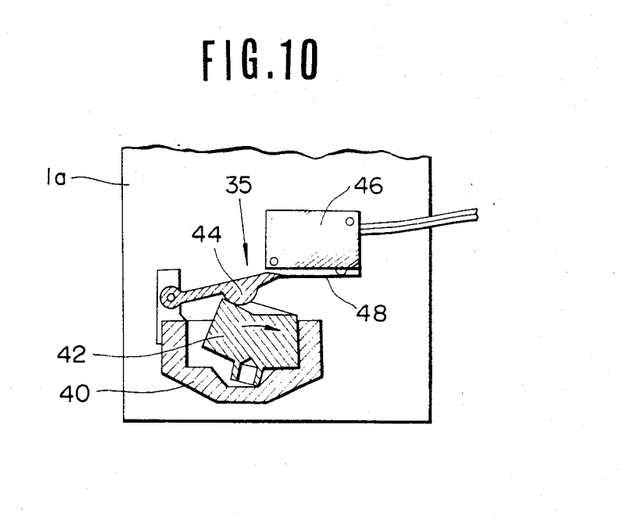

Referring to FIGS. 1, 9 and 10, the low G sensor 35 includes a holder 40 securely mounted to the side wall 1a, a standing weight 42, a lever 44 and a micro switch 46 provided with an actuator 48. When the seat belt retractor is subject to an acceleration or a deceleration greater than a predetermined value, i.e., a predetermined G, which is set lower than a predetermined value at which the emergency locking mechansim is actuated to lock the take-up shaft 2, the weight 42 tilts to move the lever 44 upwards as viewed in FIG. 10, pressing the actuator 48, thereby turning ON the micro switch 46. The weight 42 stays in the position illustrated by FIG. 9 as long as the acceleration or deceleration is less than the predetermined value.

Figure 4A:
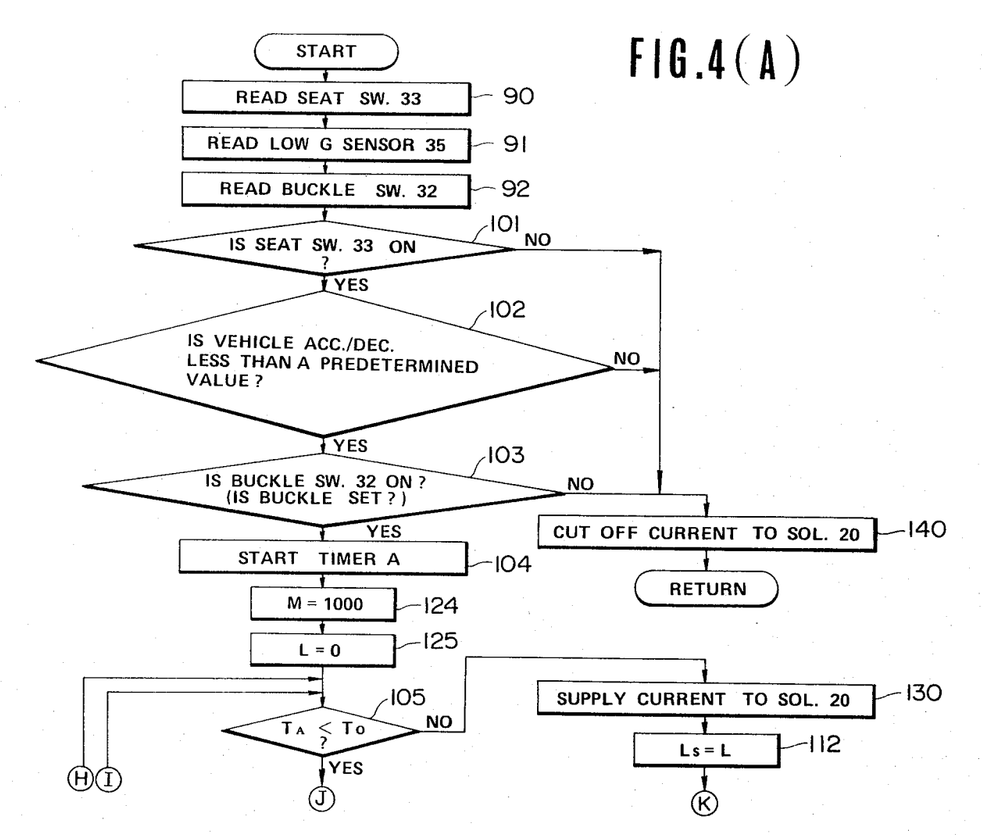
FIGS. 4(A) and 4(B) are a flowchart illustrating the operation carried out by the control unit.
Figure 4B:
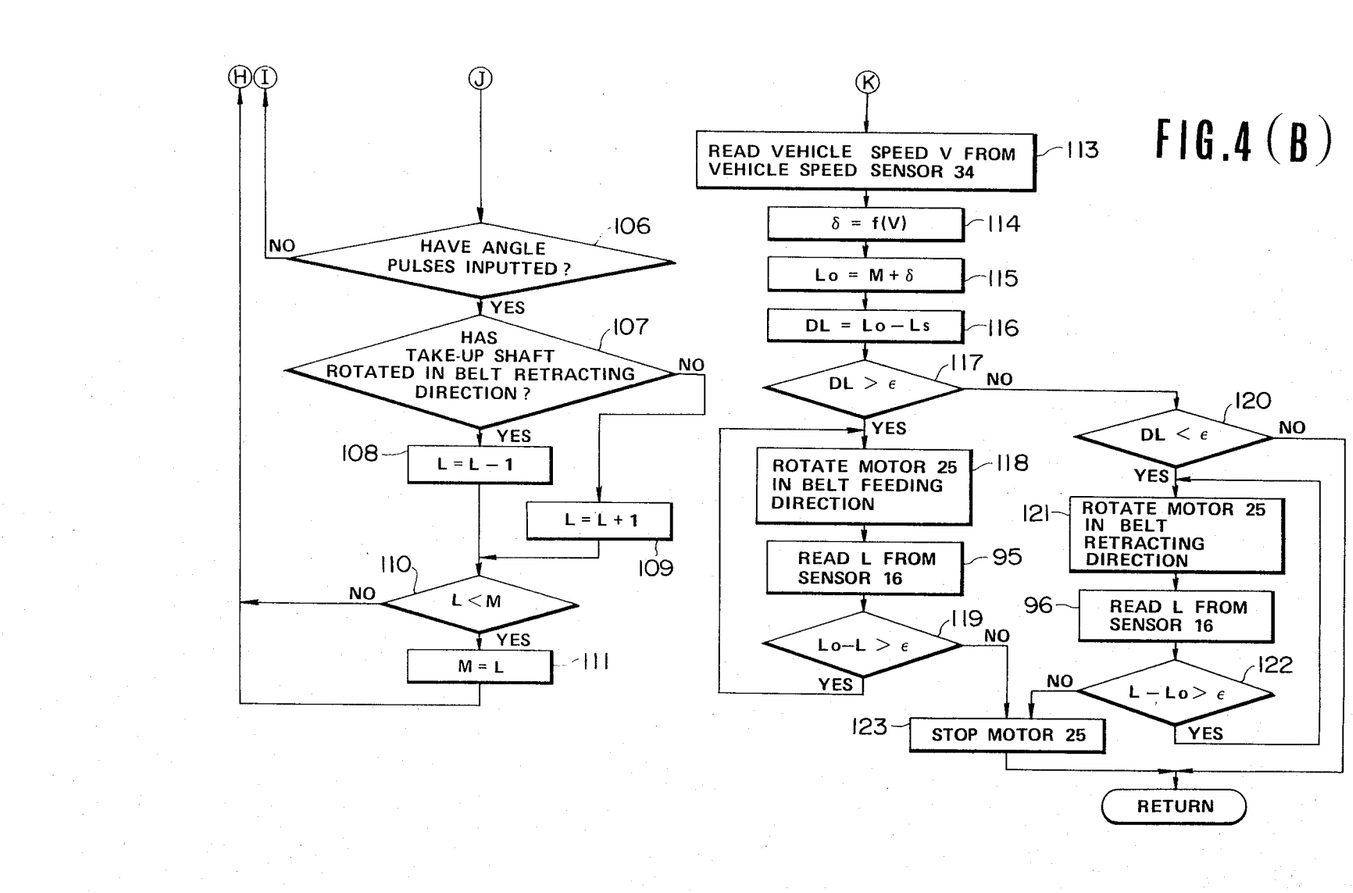

Referring to FIGS. 4(A) and 4(B), the operation of the seat belt retractor is described along the flowchart shown therein.

(1) With the return spring 4, the take-up shaft 2 retracts the seat belt 5 before the tongue and the buckle are coupled:

The program proceeds along steps 90, 91, 92 where output signals are read from the seat switch 33, low G sensor 35 and buckle switch 32, respectively, before a step 101 is executed. In the step 101, a determination is made whether the seat switch 33 is turned ON or not. Since, the seat switch 33 is OFF while the seat occupant is selecting his appropriate seat position by operating the seat sliding mechanism or the seatback tilting mechanism, the program proceeds to a step 140 where an instruction of cutting off and electric current supplied to the solenoid 20 is produced before the program returns to START. Thus, the solenoid 20 is not energized, thus leaving the stopper lever 17 disengaged from the ratchet wheel 8 under the action of the spring 18.

Figure 5:
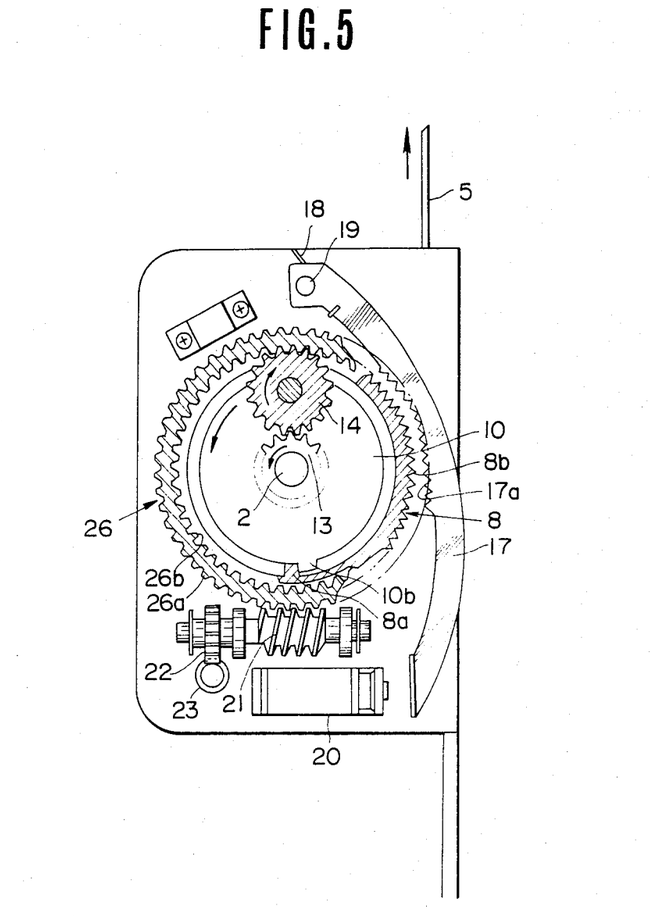
FIGS. 5 through 8, each being a sectional view along the line A—A of FIG. 1, illustrate various modes of operation of the seat belt retractor.

If the seat switch 33 is turned ON after the seat adjustment has been completed, the program proceeds from the step 101 to a step 102 where a determination is made by checking the output from the low G sensor 35 whether the vehicle acceleration or deceleration is less than the predetermined value or not. Since the vehicle is at standstill, the program proceeds from the step 102 to a step 103 where a determination is made whether the buckle switch 32 is ON or not. Since the buckle switch 32 is OFF before the seat occupant wears the seat belt 5, the program proceeds from the step 103 to the step 140 before returning to the START. Thus, the stopper lever 17 remains in the disengaged position. Under this condition where the stopper level 17 is disengaged from the ratchet wheel 8, the take-up shaft 2 can rotate in both directions, i.e., in the belt retracting direction under the action of the return spring 4 and in the belt feeding direction against the action of the return spring 4 since the memory wheel 10 and the ratchet wheel 8 can rotate in both directions and thus the planet pinion 14 can orbit in both directions although the ring gear 26 engaged with the worm 21 is fixed. Therefore, the seat belt 5 can be pulled out of the seat belt retractor. Pulling the seat belt 5 causes the take-up shaft 2 to rotate counterclockwise as viewed in FIG. 5, i.e., in the belt feeding direction, causing the planet pinion 14 to rotate clockwise around the spindle 10a and orbit counterclockwise, thus causing the memory wheel 10 to rotate counterclockwise. The counterclockwise rotation of the memory wheel 10 is followed by the ratchet wheel 8 because of the driving connection by the spring 9. It will be understood that the rotation of the take-up shaft 2 in the belt feeding direction is allowed because the orbiting movement of the planet pinion 14 is not restrained although the rotation of the ring gear 26 is prevented.

Figure 6:
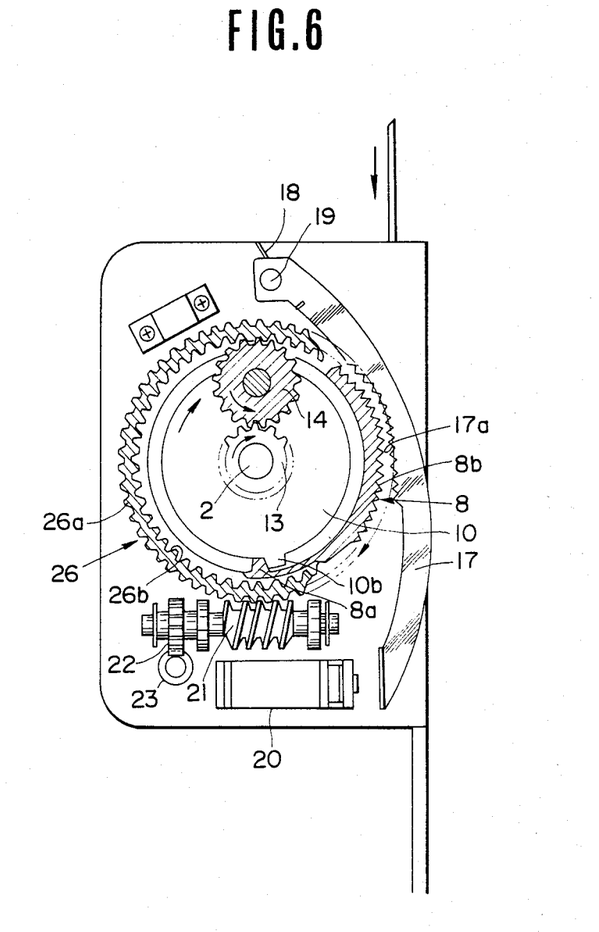

(2) The tensionless state is established upon elapse of a predetermined period of time after the tongue and buckle are coupled and memorized in terms of an angular position of the memory wheel 10:

The buckle switch 32 becomes turned ON when the tongue is coupled with the buckle. In this case, the program proceeds from the step 103 to a step 104 where the timer A is started. A predetermined period of time To, such as around 10 seconds, is set in the timer A. This period of time is empirically determined on the recognition that the seat occupant will finish arranging his posture within this period of time after coupling the tongue with the buckle. After the execution of the step 104, the program proceeds to a step 124 where a reference belt slack M is given 1000 in terms of an angle of rotation and a step 125 where an actual belt slack is given zero (0). After setting M and L, the program proceeds to a step 105 where a determination is made whether or not the timer value $T_A$ is less than To. In this step 105, the elapsed time $T_A$ after the coupling of the tongue with the buckle is checked. If the timer value $T_A$ is less than To, the program proceeds from the step 105 to a step 106 where a determination is made whether or not the angle pulses have been inputted from the angular position sensor 16. If the answer to the question in the step 106 is NO, the program returns to the step 105, while if the answer is YES, a step 107 is executed where a determination is made based on the pulses from the angular position sensor 16 whether or not the take-up shaft 2 has rotated in the belt retracting direction, i.e., in the clockwise direction as viewed in FIG. 6. If the answer to the question in the step 107 is YES, the proram proceeds to a step 108 where L is decreased by one (1), while if the answer is NO, the program proceeds to a step 109 where L is increased by one (1). After the execution of the step 108 or step 109, a step 110 is executed where a determination is made whether L is less than M or not. If L is less than M, the program proceeds to a step 111 where M is given L and the program returns to the step 105. The take-up shaft 2 can rotate under the action of the spring 4 in the belt retracting direction, i.e., clockwise as viewed in FIG. 6 so as to retract the seat belt 5, thus removing the slack, in any. As mentioned before, since the ring gear 26 is fixed, clockwise rotation of the take-up shaft 2 together with the sun gear 13 causes the memory wheel 10 and the ratchet wheel 8 to rotate in the same direction. As a result, the slack is removed within the predetermined period of time To after the seat occupant has coupled the tongue with the buckle.

The angular position at the time when the tensionless state is established is memorized by preventing the memory wheel 10 from rotating further in the same direction as the belt retracting direction of the take-up shaft 2:

If the timer value $T_A$ has exceeded the predetermined period of time To, i.e., when it is recognized that the seat occupant has finished arranging his posture, the program proceeds from the step 105 to a step 130 where the electric current is supplied to the solenoid 20, thereby to energize the same. The energization of the solenoid 20 attracts the stopper lever 17 against the spring 18 into locking engagement with the ratchet wheel 8, locking the ratchet wheel 8, thus preventing further rotation of the memory wheel 10 in the same direction as the belt retracting direction of the take-up shaft 2 by the engagement of the projection 10b with the projection 8a of the ratchet wheel 8. Thus, the angular position of the take-up shaft 2 at the time when the seat belt fits around the seat occupant is memorized by preventing the planet pinion 14 from orbiting around the sun gear 13 in the same direction as the belt retracting direction of the take-up shaft 2. As a result, the tensionless state is established. Under this condition, although further rotation of the take-up shaft 2 in the belt retracting direction is prevented, the take-up shaft 2 can rotate in the belt feeding direction because the planet pinion 14 can orbit in the belt feeding direction against the action of the spring 9, thus allowing the protraction of the seat belt 5. This will be discussed again later.

(3) Automatic provision of an appropriate belt slack after establishment of the tensionless state:

Referring back to FIGS. 4(A) and 4(B), after executing the step 130, a step 112 is executed where the angle of the rotation L at the time when the solenoid 20 is energized is stored as Ls, then the program proceeds to a step 113 where vehicle speed V is read from the vehicle speed sensor 34 and to a step 114 where an appropriate slack $\delta$ of the seat belt is arithmetically determined by an equation $\delta = f(v)$, with slack $\delta$ is variable with the vehicle speed V. Then, a stop 115 is executed where the reference belt slack M is added to the appropriate slack $\delta$ to provide a desired belt slack Lo, and the program proceeds to a step 116 where a difference DL is obtained by subtracting Ls from Lo.

After execution of the step 116, the program proceeds to a step 117 where a determination is made whether or not the difference DL is greater than a small value $\epsilon$, where the small value $\epsilon$ is set so as to prevent the occurrence of hunting operation. If DL is greater than $\epsilon$, a step 118 is executed where an instruction signal is produced to rotate the motor 25 in the belt feeding direction and the program proceeds to a step 95 where the angle of rotation L is read from the angular position sensor 16. After executing the step 95, a step 119 is executed where a determination is made whether a difference, i.e., a subtraction of L from Lo, is greater than the small value $\epsilon$ or not. If the difference Lo-L is greater than $\epsilon$, the program returns to the step 118 to cause the motor 25 to rotate further in the belt feeding direction until the difference Lo-L becomes equal to or less than the small value $\epsilon$. If the difference Lo-L becomes equal to or less then the small value $\epsilon$, the program proceeds to a step 123 where the rotation of the motor 25 is stopped before returning to START.

If, in the step 117, the difference DL is equal to or less than $\epsilon$, the program proceeds to a step 120 where a determination is made whether or not the difference DL is less then $-\epsilon$. If the answer to the question in the step 120 is NO, the program returns to START. Viz., the motor 25 remains unactuated because the difference DL is within an allowable range. If the answer to the question in the step 120 is YES, the program proceeds to a step 121 where an instruction signal is produced to rotate the motor 25 in the belt retracting direction, and then a stop 96 is executed where the angle L is read from the angular position sensor 16. After executing the step 96, a step 122 is executed where a determination is made whether or not a difference, i.e., a subtraction of Lo from L, is greater than the small value $\epsilon$. If the difference L-Lo is greater than the small value $\epsilon$ in the step 121, the program returns to the step 121, while if the difference L-Lo is equal to or less than the deviation $\epsilon$, the program proceeds to the step 123 to stop the rotation of the motor 25 before returning to START.

Since the execution of the routine including the steps 118, 95 and 119 or the routine comprising 121, 96 and 122 takes a relatively long time, a subroutine comprising steps similar to the steps 101, 102, 103 and 140 is executed in each of the return routine. This is because the belt 5 is securely retracted to retrain the seat occupant should the vehicle decelerate or the buckle be disengaged during the execution of the above mentioned return routine.

Figure 7:
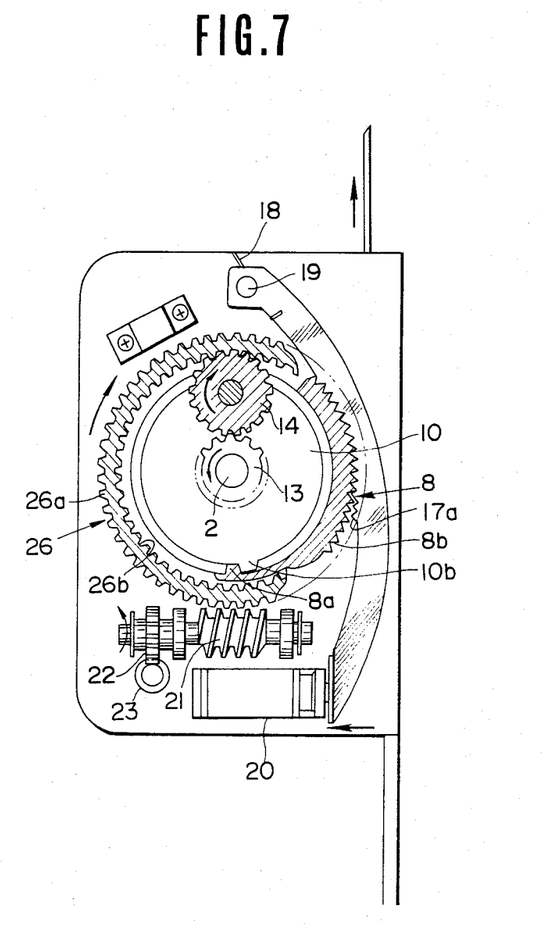

Referring to FIG. 7, a description is made as to how the take-up shaft 2 is rotated when the motor rotates in a belt feeding direction thereof in the step 118:

This rotates of the motor 25 causes the ring gear 26 to rotate clockwise as viewed in FIG. 7. The clockwise rotation of the ring gear 26 causes the plant pinion 14 to rotate clockwise about the spindle 10a and tend to orbit clockwise around the sun gear 13. But the clockwise orbiting movement of the planet pinion 14 is prevented by the memory wheel 10 engaged with the ratchet wheel 8 which is locked, so that the clockwise rotation of the planet pinion 14 causes the sun gear 13 and in turn the take-up shaft 2 to rotate counterclockwise, i.e., in the belt feeding direction. Thus, the seat belt 5 is protracted. The motor 25 rotates to cause the take-up shaft 2 to rotate in the belt feeding direction until the desired belt slack Lo is established (a flow along steps 118, 95, 119 and 123).

Hereinafter, a description is made as to how the take-up shaft 2 is rotated in the belt retracting direction when the motor 25 rotates in a belt retracting direction thereof in the step 121:

This rotation of the motor 25 in the belt retracting direction causes the ring gear 26 to rotate counterclockwise as viewed in FIG. 7. The counterclockwise rotation of the ring gear 26 causes the planet pinion 14 to rotate counterclockwise and orbit counterclockwise. Although the planet pinion 14 can orbit counterclockwise, an angle through which the planet pinion 14 can orbit in this direction is limited by the spring 9. Thus, after the planet pinion 14 moved along the orbit through the limited angle in the counterclockwise direction, the planet pinion 14 is prevented from orbiting further in this direction. As a result, the counterclockwise rotation of the planet pinion 14 causes the sun gear 13 and the take-up shaft 2 to rotate clockwise, i.e., in the belt retracting direction. The motor 25 rotates in the belt retracting direction until the desired belt slack Lo is obtained (see a flow along steps 121, 96, 122 and 123).

Figure 8:
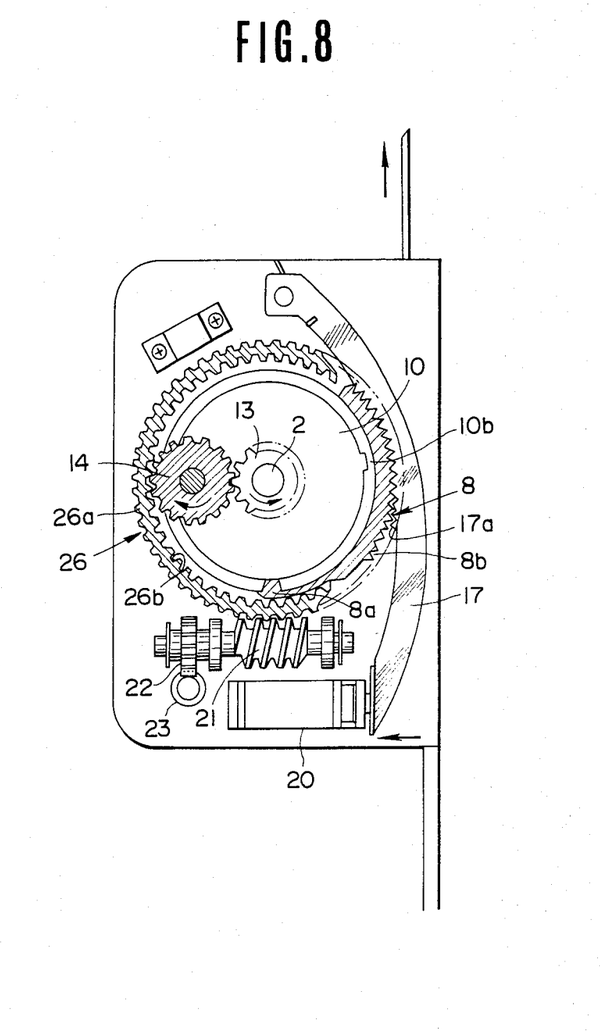

(4) Referring to FIG. 8, a description is made as to how the seat belt retractor feeds the belt 5 as the seat occupant changes his posture in order to, for example, take out an article from a glove box:

Since the planetary pinion 14 is allowed to orbit against the spring 9 counterclockwise through the limited angle, the take-up shaft 2 together with the sun gear 13 can rotate counterclockwise although the ring gear 26 is fixed as engaged with the worm 21, thus allowing the seat belt to be pulled out of the seat belt retractor so as to follow the change in posture of the seat occupant. Thus, the counterclockwise rotation of the sun gear 13 causes the planet pinion 14 to rotate clockwise, rotating the memory wheel 10 clockwise against the action of the spring 9. The angle of the counterclockwise rotation of the memory wheel 10 in this circumstances is limited by the spring 9. But, since the sun gear 13 can make R turns as the memory wheel 10 make a single turn. R can be expressed as R=1+(the number of teeth 26b of the ring gear 26)/(the number of teeth of the sun gear 13).

Thus, suitably selecting the number of the teeth, the maximum feeding length of the seat belt 5 upon following the change in posture of the seat occupant can be set to a practical feasible value. When the seat occupant resumes his original posture, the take-up shaft 2 and the sun gear 13 rotate clockwise as viewed in FIG. 8 owing to the action of the spring 4, causing the planet pinion 14 to orbit clockwise while rotating counterclockwise until the memory wheel 10 assumes the position where the projection 10b engages the projection 8a of the ratchet wheel 8. The tensionless state is reestablished when the seat occupant assumes his original posture again.

(5) The tensionless state is released and the seat belt 5 fits around the seat occupant when the vehicle decelerates rapidly or makes a sharp turn or passes through a rough terrain:

Referring again to the flowchart shown in FIGS. 4(A) and 4(B), the low G sensor 35 generates a signal when the vehicle rapidly decelerates or makes a sharp turn or passes through a rough terrain, the program proceeds from the step 102 to the step 140 to cut off the current applied to the solenoid 20, thereby to deenergize the same. When the solenoid 20 is deenergized, the stopper lever 17 is disengaged from the ratchet wheel 8 (see FIG. 6) due to the action of the spring 18. This allows the memory wheel 10 to rotate further in the same direction as the belt retracting direction of the take-up shaft 2. Since, now the planet pinion 14 can rotate, the take-up shaft 2 is rotated in the belt retracting direction by the return spring 4, applying the tension on the seat belt 5, thus releasing the tensionless state.

(6) The belt 5 is retracted by the seat belt retractor after the tongue is disengaged from the buckle:

When the seat occupant disengages the tongue from the buckle in order to get off the vehicle, the buckle switch 32 is turned OFF. In this case, the program proceeds from the step 103 to the step 140 where the current supplied to the solenoid 20 is cut off to deenergize the same. The deenergization of the solenoid 20 establishes the state wherein the take-up shaft 2 is allowed to rotate in the belt retracting direction under the action of the return spring 4. As a result, the take-up shaft 2 can rotate in the belt retracting direction under the action of the spring 4 until the seat belt 5 is completely stored into the housing 1 of the seat belt retractor.

According to the seat belt retractor described above, an appropriate slack is always provided depending upon running state of a vehicle, i.e., a vehicle speed for example, thereby to secure the safety of the seat occupant. Even in the tensionless state, the seat belt retractor can feed the belt so as to follow the change in posture of the seat occupant. Thus, the seat occupant can easily change his posture and thus becomes free from feeling restrained by the seat belt.

According to the seat belt retractor, the retraction of the belt is effected by the return spring 4, so that should if the control unit fail to function properly, the seat belt retractor could retract the seat belt under the action of the return spring 4 until the seat belt 5 fits around the seat occupant, thus serving as an ELR (Emergency Lock Retractor.

What is claimed is:

1. A seat belt retractor comprising:
 a housing;
 a take-up shaft rotatably mounted to said housing;
 a spring means for biasing said take-up shaft in a belt retracting direction of retracting a seat belt;
 a gear mechanism operatively coupled to said take-up shaft;
 a tensionless mechanism operatively coupled to said gear mechanism and operable to prevent said take-up shaft from rotating in said belt retracting direction;
 a motor actuated slack control mechanism operatively coupled to said gear mechanism and operable to rotate said take-up shaft; and
 means for controlling operation of said tensionless mechanism and said motor actuated slack control mechanism.

2. A seat belt retractor as claimed in claim 1, wherein said gear mechanism comprises a planetary gearing which includes a sun gear nonrotatably mounted on said take-up shaft, a ring gear rotatably mounted on said take-up shaft and a planet pinion meshing with said sun gear and said ring gear;

said tensionless mechanism is operable to prevent said planet pinion from orbiting in the same direction as said belt retracting direction of said take-up shaft; and said motor actuated slack control mechanism meshes with said ring gear and is operable to rotate said ring gear.

3. A seat belt retractor as claimed in claim 2, wherein said tensionless mechanism includes a memory wheel serving as a carrier for said planet pinion and having a projection, a ratchet wheel rotatably mounted to said take-up shaft and having a projection, means for biasing said projection of said memory wheel into engagement with said projection of said ratchet wheel, a stopper lever movable to engage with said ratchet wheel, and a solenoid means for attracting said stopper lever into engagement with said ratchet wheel.

4. A seat belt retractor as claimed in claim 2, wherein said controlling means comprises a microcomputer including a sensor means for generating an output signal indicative of running state of a vehicle and a microcomputer including a ROM which stores a program wherein a desired slack is determined in response to said output signal.

5. In a vehicle having a seat having a seat adjustable mechanism,
a seat belt retracting comprising a housing, a take-up shaft rotatably mounted to said housing, a spring means for biasing said take-up shaft ina belt retracting direction of retracting a seat belt, a planetary gearing including a sun gear nonrotatably mounted to said take-up shaft, a ring gear rotatably mounted to said take-up shaft and a planet pinion meshing with said sun gear and said ring gear, a tensionless mechanism operable to prevent said planet pinion from orbiting in the same direction as said belt retracting direction of said take-up shaft, a motor actuated slack control mechanism meshing with said ring gear and operable to rotate said ring gear;
a sensor means for generating an output signal indicative of running state of the vehicle;
a control unit operative connected to said tensionless mechanism and said motor actuated slack control mechanism, said control unit including means for determining a desired slack of the seat belt in response to said output signal, and means for controlling said motor actuated slack control mechanism in such a manner as to reduce a deviation from said desired slack.

* * * * *